(12) United States Patent
Noda

(10) Patent No.: US 11,067,159 B2
(45) Date of Patent: Jul. 20, 2021

(54) ROBOT, GEAR DEVICE, AND GEAR DEVICE UNIT

(71) Applicant: Seiko Epson Corporation, Tokyo (JP)

(72) Inventor: Yoichi Noda, Fujimi (JP)

(73) Assignee: Seiko Epson Corporation

( * ) Notice: Subject to any disclaimer, the term of this patent is extended or adjusted under 35 U.S.C. 154(b) by 150 days.

(21) Appl. No.: 16/410,123

(22) Filed: May 13, 2019

(65) Prior Publication Data

US 2019/0346034 A1    Nov. 14, 2019

(30) Foreign Application Priority Data

May 14, 2018 (JP) .............................. JP2018-093303

(51) Int. Cl.
  *F16H 49/00* (2006.01)
  *B25J 9/10* (2006.01)
(52) U.S. Cl.
  CPC ............ *F16H 49/001* (2013.01); *B25J 9/102* (2013.01)
(58) Field of Classification Search
  CPC .. F16H 49/001; F16H 2049/003; B25J 9/1025
  See application file for complete search history.

(56) References Cited

U.S. PATENT DOCUMENTS

| 4,823,638 | A | 4/1989 | Ishikawa | |
| 2018/0016972 | A1* | 1/2018 | Nagai | F16H 49/001 |
| 2018/0223730 | A1* | 8/2018 | Suda | F02B 75/048 |
| 2018/0281177 | A1* | 10/2018 | Kusumoto | F16H 49/001 |
| 2019/0186311 | A1* | 6/2019 | Nagai | F16H 57/0456 |

FOREIGN PATENT DOCUMENTS

| JP | S63-115943 A | 5/1988 |
| JP | H07-293643 A | 11/1995 |
| JP | H09-250609 A | 9/1997 |
| JP | 2018-021479 A | 2/2018 |
| WO | WO-1995-028583 A1 | 10/1995 |
| WO | WO-2018-025765 A1 | 2/2018 |

* cited by examiner

*Primary Examiner* — Terence Boes

(74) *Attorney, Agent, or Firm* — Harness, Dickey & Pierce, P.L.C.

(57) ABSTRACT

A robot includes a gear device. The gear device includes an internal gear including internal teeth and an external gear including external teeth, which partially mesh with the internal gear, and having flexibility, the external gear relatively rotating around a rotation axis with respect to the internal gear, and a wave motion generator configured to come into contact with an inner circumferential surface of the external gear and move a meshing position of the internal gear and the external gear in a circumferential direction around the rotation axis. The gear device includes a wall section disposed at an end portion of tooth width of the internal gear and coupled to two dedenda adjacent to each other in the circumferential direction of the internal gear and a tooth bottom present between the two dedenda.

8 Claims, 11 Drawing Sheets

ROBOT, GEAR DEVICE, AND GEAR DEVICE UNIT

The present application is based on and claims priority from JP Application Serial Number 2018-093303, filed May 14, 2018, the disclosure of which is hereby incorporated by reference herein in its entirety.

BACKGROUND

1. Technical Field

The present disclosure relates to a robot, a gear device, and a gear device unit.

2. Related Art

In a robot including a robot arm including at least one arm, for example, a joint section of the robot arm is driven by a motor. When the joint section is driven by the motor, rotation of the motor is decelerated by a gear device (a reduction gear).

As such a reduction gear, for example, a deflection meshing gear device described in JP-A-9-250609 (Patent Literature 1) is known. The deflection meshing gear device includes an annular rigid internal gear, a flexible external gear disposed on the inner side of the rigid internal gear, and a wave motion generator fit on the inner side of the flexible external gear. A portion further on an opening end side than external teeth of the flexible external gear is extended to an end wall side of a device housing. An annular elastic seal is attached between the outer circumferential surface of the extended end portion and the inner circumferential surface of the device housing opposed to the outer circumferential surface. By providing such an elastic seal, the internal space of the device housing is partitioned. Even if lubricants having different characteristics are stored in the device housing, the lubricants are not mixed. Consequently, it is possible to supply lubricant having suitable viscosity to a lubrication target portion.

In the deflection meshing gear device described in Patent Literature 1, lubricant (grease) moves between the external teeth and the internal teeth according to meshing of the external teeth and the internal teeth. A direction of the movement is based on, for example, setting of input and output shafts. For example, in the gear device described in Patent Literature 1, the lubricant moves from a meshing portion of the external teeth and the internal teeth to a body section side on the opposite side of the opening end side of the flexible external gear. Therefore, there is a concern that a lubrication state of the meshing portion of the external teeth and the internal teeth is deteriorated.

SUMMARY

A robot according to an application example of the present disclosure includes: a first member; a second member configured to pivot with respect to the first member; a gear device configured to transmit, from one side to another side of the first member and the second member, a driving force for pivoting the second member with respect to the first member; and a driving source configured to generate the driving force. The gear device includes: an internal gear including internal teeth; and an external gear including external teeth, which partially mesh with the internal gear, and having flexibility, the external gear relatively rotating around a rotation axis with respect to the internal gear; and a wave motion generator configured to come into contact with an inner circumferential surface of the external gear and move a meshing position of the internal gear and the external gear in a circumferential direction around the rotation axis. The gear device includes a wall section disposed at an end portion of tooth width of the internal gear and coupled to two dedenda adjacent to each other in the circumferential direction of the internal gear and a tooth bottom present between the two dedenda.

DESCRIPTION OF EXEMPLARY EMBODIMENTS

Preferred embodiments of the present disclosure are explained in detail below with reference to the drawings.

1. Robot

First, a robot according to an embodiment of the present disclosure is briefly explained.

Figure 1:
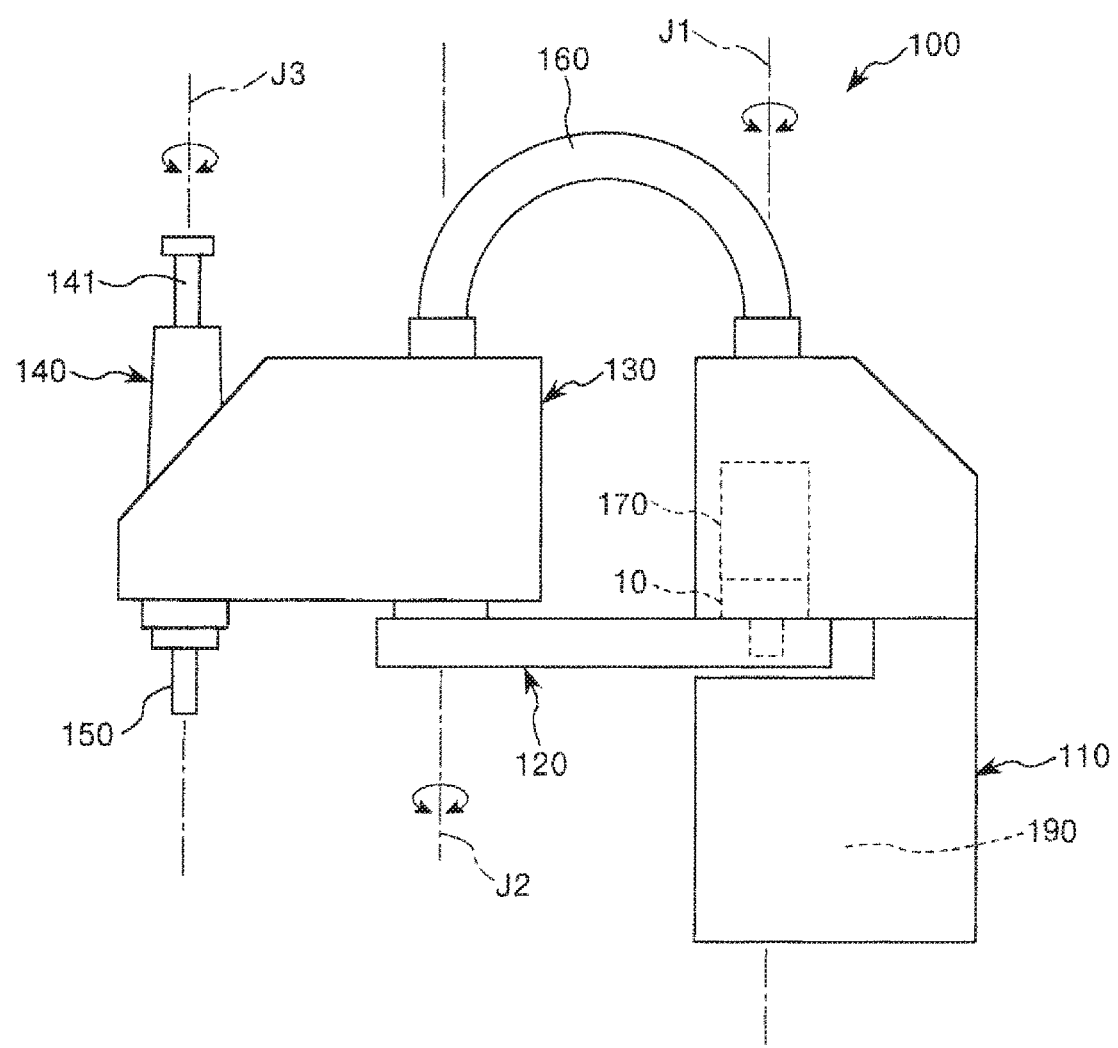
FIG. 1 is a side view showing a schematic configuration of a robot according to an embodiment of the present disclosure.

FIG. 1 is a side view showing a schematic configuration of the robot according to the embodiment of the present disclosure. In the following explanation, for convenience of explanation, the upper side in FIG. 1 is referred to as "upper" and the lower side in FIG. 1 is referred to as "lower". A base side in FIG. 1 is referred to as "proximal end side" and the opposite side of the base side (an end effector side) is referred to as "distal end side". The up-down direction in FIG. 1 is set to as "vertical direction" and the left-right direction in FIG. 1 is set to as "horizontal direction".

A robot 100 shown in FIG. 1 is a robot used for work such as supply, removal, conveyance, and assembly of a precision instrument and components (target objects) configuring the precision instrument. The robot 100 includes, as shown in FIG. 1, a base 110, a first arm 120, a second arm 130, a work head 140, an end effector 150, and a wiring section 160. The sections of the robot 100 are briefly explained below in order.

The base 110 is fixed to, for example, a not-shown floor surface by bolts or the like. A control device 190 that collectively controls the robot 100 is set on the inside of the base 110. The first arm 120 is coupled to the base 110 to be pivotable around a first axis J1 (a pivoting axis), which extends along the vertical direction, with respect to the base 110.

In the base 110, a driving source including a motor 170, which is a first motor such as a servo motor that generates a driving force for pivoting the first arm 120, and a gear device unit 10, which is a first reduction gear that decelerates rotation by the driving force of the motor 170, is set. An input shaft of the gear device unit 10 is coupled to a rotating shaft of the motor 170. An output shaft of the gear device unit 10 is coupled to the first arm 120. Therefore, when the motor 170 is driven and the driving force of the motor 170 is transmitted to the first arm 120 via the gear device unit 10, the first arm 120 pivots in a horizontal plane around the first axis J1 with respect to the base 110.

The second arm 130 is coupled to the distal end portion of the first arm 120 to pivotable around a second axis J2 (a pivoting axis), which extends along the vertical axis, with respect to the first arm 120. In the second arm 130, although not shown in FIG. 1, a driving source including a second motor that generates a driving force for pivoting the second arm 130 and a second reduction gear that decelerates rotation by the driving force of the second motor is set. The driving force of the second motor is transmitted to the second arm 130 via the second reduction gear, whereby the second arm 130 pivots in a horizontal plane around the second axis J2 with respect to the first arm 120.

The work head 140 is disposed at the distal end portion of the second arm 130. The work head 140 includes a spline shaft 141 inserted through a spline nut and a ball screw nut (both of which are not shown in FIG. 1) coaxially disposed at the distal end portion of the second arm 130. The spline shaft 141 is rotatable around a third axis J3 of the spline shaft 141 with respect to the second arm 130 and is movable (elevatable) in the up-down direction.

In the second arm 130, although not shown in FIG. 1, a rotation motor and an elevation motor are disposed. A driving force of the rotation motor is transmitted to the spline nut by a not-shown driving-force transmission mechanism. When the spline nut normally and reversely rotates, the spline shaft 141 normally and reversely rotates around the third axis J3 extending along the vertical direction.

On the other hand, a driving force of the elevation motor is transmitted to the ball screw nut by a not-shown driving-force transmitting mechanism. When the ball screw nut normally and reversely rotates, the spline shaft 141 moves up and down.

The end effector 150 is coupled to the distal end portion (the lower end portion) of the spline shaft 141. The end effector 150 is not particularly limited. Examples of the end effector 150 include an end effector that grips a conveyed object and an end effector that machines a workpiece.

A plurality of wires coupled to the electronic components (e.g., the second motor, the rotation motor, and the elevation motor) disposed in the second arm 130 are drawn around to the inside of the base 110 through the tubular wiring section 160 that couples the second arm 130 and the base 110.

Further, such a plurality of wires are collected in the base 110 to be drawn around to the control device 190 set in the base 110 together with wires coupled to the motor 170 and a not-shown encoder.

As explained above, the robot 100 includes the base 110, which is a first member, the first arm 120, which is a second member provided pivotably with respect to the base 110, and the gear device unit 10 that transmits a driving force from one side to the other side of the base 110 and the first arm 120.

The first arm 120 and the second arm 130 may be collectively grasped as "second member". The "second member" may further include the work head 140 and the end effector 150 in addition to the first arm 120 and the second arm 130. "Pivot" includes moving in both directions including one direction and the opposite direction of the one direction with respect to a certain center point and rotating with respect to the certain center point.

In this embodiment, the first reduction gear is configured by the gear device unit 10. However, the second reduction gear may be configured by the gear device unit 10. Both of the first reduction gear and the second reduction gear may be configured by the gear device unit 10. When the second reduction gear is configured by the gear device unit 10, the first arm 120 only has to be grasped as the "first member" and the second arm 130 only has to be grasped as "second member". A gear device unit 10B explained below may be used instead of the gear device unit 10.

In this embodiment, the motor 170 and the gear device unit 10 are provided in the base 110. However, the motor 170 and the gear device unit 10 may be provided in the first arm 120. In this case, the output shaft of the gear device unit 10 only has to be coupled to the base 110.

2. Gear Device Unit

A gear device unit according to an embodiment of the present disclosure is explained.

First Embodiment

Figure 2:
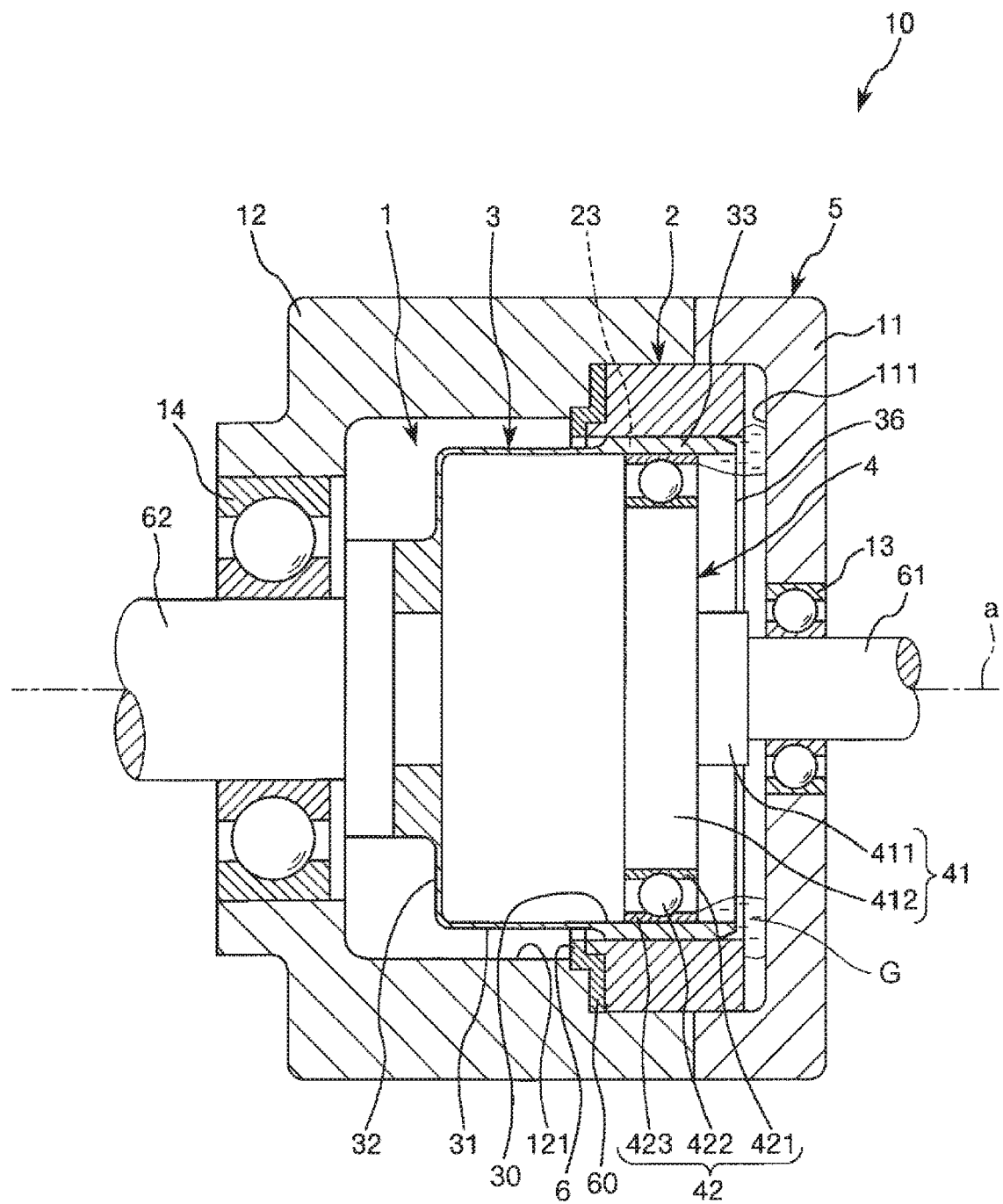
FIG. 2 is sectional view showing a gear device unit according to a first embodiment of the present disclosure.
Figure 3:
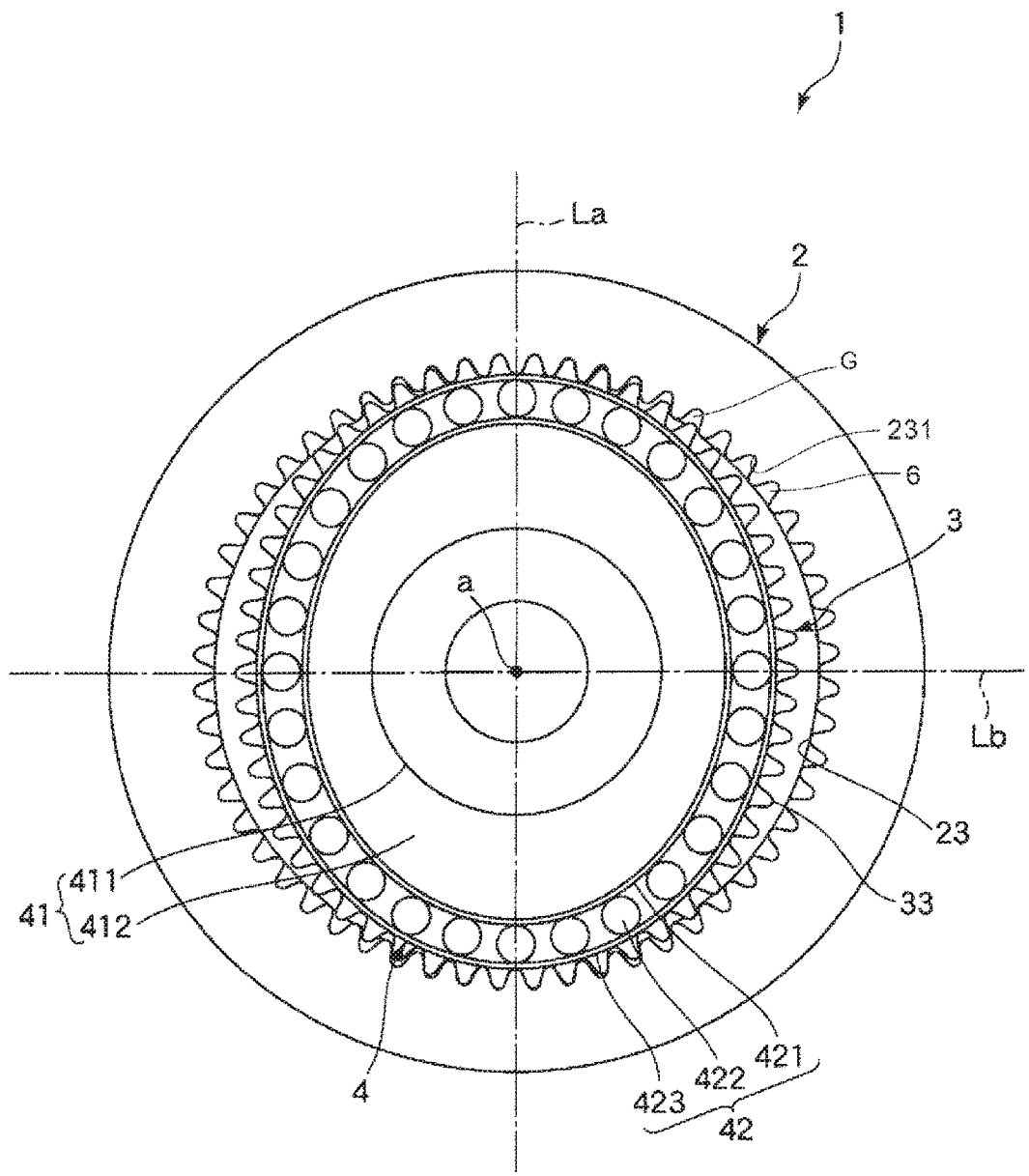
FIG. 3 is a front view of the gear device unit shown in FIG. 2.

FIG. 2 is a sectional view showing a gear device unit according to a first embodiment of the present disclosure. FIG. 3 is a front view of the gear device unit shown in FIG. 2. In the figures, for convenience of explanation, dimensions of sections are exaggerated and shown as appropriate according to necessity. Dimension ratios among the sections do not always coincide with actual dimension ratios.

The gear device unit 10 shown in FIG. 2 is a wave motion gear device and is used as, for example, a reduction gear. The gear device unit 10 includes a gear device 1 and a case 5 that houses the gear device 1. The gear device 1 and the case 5 are integrated. Lubricant G is disposed in the case 5 of the gear device unit 10. The sections of the gear device unit 10 are explained below. The case 5 only has to be provided according to necessity and may be omitted.

Gear Device

The gear device 1 includes a rigid gear 2, which is an internal gear, a flexible gear 3, which is a cup-type external gear disposed on the inner side of the rigid gear 2, and a wave motion generator 4 disposed on the inner side of the flexible gear 3.

In this embodiment, the rigid gear 2 is fixed (coupled) to the base 110 (the first member) of the robot 100 via the case 5. The flexible gear 3 is coupled to the first arm 120 (the second member) of the robot 100. The wave motion generator 4 is coupled to the rotating shaft of the motor 170 (the driving source) disposed in the base 110 of the robot 100.

When the rotating shaft of the motor 170 rotates (i.e., a driving force is generated), the wave motion generator 4 rotates at the same rotating speed as rotating speed of the rotating shaft of the motor 170. The numbers of teeth of the rigid gear 2 and the flexible gear 3 are different. Therefore, the rigid gear 2 and the flexible gear 3 relatively rotate around an axis "a" while a meshing position of the rigid gear 2 and the flexible gear 3 moves in the circumferential direction. In this embodiment, the number of teeth of the rigid gear 2 is larger than the number of teeth of the flexible gear 3. Therefore, the flexible gear 3 can be rotated at rotating speed lower than the rotating speed of the rotating shaft of the motor 170. That is, it is possible to realize a reduction gear in which the wave motion generator 4 is an input shaft side and the flexible gear 3 is an output shaft side.

Depending on a form of the case 5, even if the flexible gear 3 is fixed (coupled) to the base 110 and the rigid gear 2 is coupled to the first arm 120, the gear device unit 10 can be used as a reduction gear. As explained below, even if the rotating shaft of the motor 170 is coupled to the flexible gear 3, the gear device unit 10 can be used as a reduction gear. In this case, the wave motion generator 4 only has to be fixed (coupled) to the base 110 and the rigid gear 2 only has to be coupled to the first arm 120. When the gear device unit 10 is used as a speed-increasing gear (when the flexible gear 3 is rotated at rotating speed higher than the rotating speed of the rotating shaft of the motor 170), the relation between the input side and the output side only has to be reversed.

As shown in FIGS. 2 and 3, the rigid gear 2 is a gear configured by a rigid body and is a ring-like internal gear including internal teeth 23. In this embodiment, the rigid gear 2 is a spur gear. That is, the internal teeth 23 have tooth traces parallel to the axis "a". A tooth trace direction of the internal teeth 23 may be inclined with respect to the axis "a". That is, the rigid gear 2 may be a helical gear or a double-helical gear.

As shown in FIGS. 2 and 3, the flexible gear 3 is inserted through the inner side of the rigid gear 2. The flexible gear 3 is a gear having flexibility deflectively deformable in the radial direction and is an external gear including external teeth 33 that mesh with the internal teeth 23 of the rigid gear 2. The number of teeth of the flexible gear 3 is smaller than the number of teeth of the rigid gear 2. Since the numbers of teeth of the flexible gear 3 and the rigid gear 2 are difference from each other in this way, it is possible to realize a reduction gear.

In this embodiment, the flexible gear 3 is formed in a cup shape including an opening 36 opened at one end in the axis "a" direction (an end portion on the center right side in FIG. 2). The external teeth 33 are formed from the opening 36 toward the other end portion side. The flexible gear 3 includes a tubular (more specifically, cylindrical) opening section 30 around the axis "a", a body section 31 coupled to the external teeth 33 on the other end portion side in the axis "a" direction, and a bottom section 32 coupled to the body section 31 further on the other end portion side. Consequently, one end portion of the opening section 30 easily bends in the radial direction compared with the bottom section 32. Therefore, it is possible to realize satisfactory deflective meshing of the flexible gear 3 with the rigid gear 2. Further, it is possible to increase the rigidity of the bottom section 32 to which a shaft 62 (e.g., an output shaft) is coupled. Therefore, the gear device unit 10 has extremely small backlash and is suitable for a use in which reversal is repeated. Since a ratio of the numbers of teeth simultaneously meshing with each other is large, a force applied to one tooth is small. A high torque capacity can be obtained. Since the gear device unit 10 can be used for such a harsh use, lubricant is requested to have high lubrication performance and, as explained above, the lubricant is requested to be retained in a meshing portion.

As shown in FIGS. 2 and 3, the wave motion generator 4 is disposed on the inner side of the flexible gear 3 and is rotatable around the axis "a". The flexible gear 3 and the rigid gear 2 are rotatable around the same axis "a". The wave motion generator 4 deforms the cross section of the opening section 30 of the flexible gear 3 into an elliptical shape or an oval shape having a major axis La and a minor axis Lb and meshes a part of the external teeth 33 with the internal teeth 23 of the rigid gear 2.

In this embodiment, the wave motion generator 4 includes a cam 41 and a bearing 42 attached to the outer circumference of the cam 41. The cam 41 includes a shaft section 411 that rotates around the axis "a" and a cam section 412 that projects to the outer side from one end portion of the shaft section 411.

A shaft 61 (e.g., an input shaft) is coupled to the shaft section 411. The outer circumferential surface of the cam section 412 is formed in an elliptical shape or an oval shape when viewed from a direction along the axis "a". The bearing 42 includes a flexible inner ring 421 and a flexible outer ring 423 and a plurality of balls 422 disposed between the inner ring 421 and the outer ring 423. The inner ring 421 is fit in the outer circumferential surface of the cam section 412 of the cam 41 and elastically deformed into an elliptical shape or an oval shape conforming to the outer circumferential surface of the cam section 412. According to the elastic deformation of the inner ring 421, the outer ring 423 is also elastically deformed into an elliptical shape or an oval shape. The outer circumferential surface of the inner ring 421 and the inner circumferential surface of the outer ring 423 respectively have orbital planes for rolling the plurality of balls 422 while guiding the plurality of balls 422 along the circumferential direction. The plurality of balls 422 are held by a not-shown holding device to keep intervals in the circumferential direction of the plurality balls 422 constant. Not-shown grease is disposed in the bearing 42. The grease may be the same as or may be different from lubricant G explained below.

In such a wave motion generator 4, the direction of the cam section 412 changes according to the rotation of the cam 41 around the axis "a". According to the change of the direction of the cam section 412, the outer circumferential surface of the outer ring 423 is deformed. The wave motion generator 4 moves a meshing position of the rigid gear 2 and the flexible gear 3 in the circumferential direction.

The rigid gear 2, the flexible gear 3, and the wave motion generator 4 are respectively desirably formed of metal materials. In particular, an iron-based material is desirably used because the iron-based material is excellent in mechanical characteristics and machinability and is relatively inexpensive. Such an iron-based material is not particularly limited. However, the iron-based material is desirably any one of cast iron, nickel-chrome-molybdenum steel, chrome-molybdenum steel (SCM), maraging steel, precipitation hardening stainless steel, and nodular graphite cast iron (ductile cast iron). When the nodular graphite cast iron is used and quenching and tempering treatment or austemper treatment is performed, since the nodular graphite cast iron has satisfactory fatigue strength, it is possible to achieve extension of the life of the gear device unit 10. Further, when the nickel-chrome-molybdenum steel (e.g., SNCM439) is used in the flexible gear 3, since the hardness of the flexible gear 3 can be set higher than the hardness of the rigid gear 2 for which chrome-molybdenum steel is used, it is possible to reduce wear of the teeth of the flexible gear 3. It is possible to achieve further extension of the life of the gear device unit 10. The rigid gear 2 and the wave motion generator 4 are respectively substantial rigid bodies. Therefore, the rigid gear 2 and the wave motion generator 4 can be formed of a ceramic material or the like. However, in view of a balance of the strength with respect to the flexible gear 3, they are preferably made of a metal material. When a strength difference between these members is too large, the member having a lower strength is extremely easily worn. As a result, the life of the gear device unit 10 is likely to be short.

Case

The case 5 shown in FIG. 2 includes a substantially tabular lid body 11 that supports the shaft (e.g., the input shaft) via a bearing 13 and a cup-like main body 12 that supports the shaft 62 (e.g., the output shaft) via a bearing 14. The lid body 11 and the main body 12 are coupled (fixed) to form a space. The gear device 1 is housed in the space. The rigid gear 2 of the gear device 1 is fixed to at least one of the lid body 11 and the main body 12 by screwing or the like.

An inner wall surface 111 of the lid body 11 is formed in a shape expanding in a direction perpendicular to the axis "a" to cover the opening 36 of the flexible gear 3. An inner wall surface 121 of the main body 12 is formed in a shape conforming to the outer circumferential surface and the bottom surface of the flexible gear 3. Such a case 5 is fixed to the base 110 of the robot 100. The lid body 11 may be separate from the base 110 and fixed to the base 110 by screwing or the like or may be integral with the base 110. A constituent material of the case 5 (the lid body 11 and the main body 12) is not particularly limited. Examples of the constituent material include a metal material and a ceramics material.

Lubricant

The lubricant G is grease (semisolid lubricant). The lubricant G is disposed between the rigid gear 2 and the flexible gear 3 (a meshing portion) and between the flexible gear 3 and the wave motion generator 4 (a contact portion and a sliding portion). Consequently, it is possible to reduce friction of the meshing portion, the contact portion, and the sliding portion.

The lubricant G desirably contains base oil and a thickening agent. Examples of the base oil include paraffin-based and naphthene-based mineral oil (purified mineral oil) and synthetic oil of polyolefin, ester, and silicone. One of these kinds of base oil can be used alone or two or more of these kinds of base oil can be used in combination. Examples of the thickening agent include soap-based thickening agents such as calcium soap, calcium complexed soap, sodium soap, aluminum soap, lithium soap, and lithium complexed soap, and non-soap-based thickening agents such as polyurea, sodium terephthalate, polytetrafluoroethylene (PTFE), organic bentonite, and silica gel. One of these kinds of thickening agents can be used alone or two or more of these kinds of thickening agents can be used in combination. In the lubricant G (the grease) containing the base oil and the thickening agent as composition in this way, a three-dimensional structure formed by the thickening agent complicatedly intertangles to retain the base oil. The retained base oil is exuded little by little to exert a lubrication action.

The lubricant G desirably contains an organic molybdenum compound. The organic molybdenum compound functions as a solid lubricant or an extreme pressure agent. Consequently, it is possible to effectively reduce friction in a lubrication target section. Even if the lubrication target section comes into an extreme pressure lubrication state, it is possible to effectively prevent burn-in and scuffing. In particular, the organic molybdenum compound exerts an extreme pressure property and abrasion resistance equivalent to those of molybdenum disulfide. Moreover, the organic molybdenum compound is excellent in oxidation stability compared with the molybdenum disulfide. Therefore, it is possible to achieve extension of the life of the lubricant G.

The lubricant G may contain, besides the base oil, the thickening agent, and the extreme pressure agent (the organic molybdenum compound), an additive such as an antioxidant or an antirust agent, a solid lubricant such as graphite, molybdenum disulfide, or polytetrafluoroethylene (PTFE), or the like.

Wall Section

Figure 4:
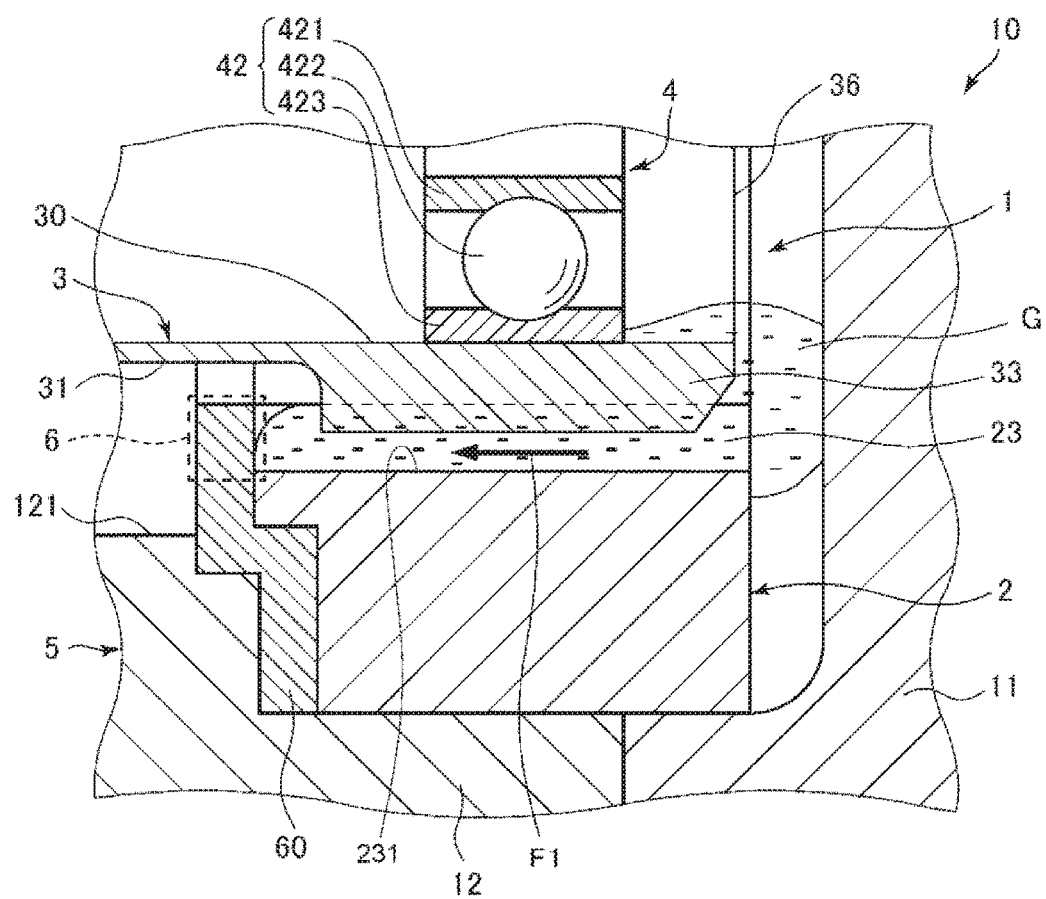
FIG. 4 is a partially enlarged view of FIG. 2.

FIG. 4 is a partially enlarged view of FIG. 2.

As shown in FIG. 4, the lubricant G is retained in the meshing portion of the internal teeth 23 and the external teeth 33. The retained lubricant G is driven by a driving force of rotation of the wave motion generator 4 to move from the meshing portion. In the case of this embodiment, since the wave motion generator 4 is coupled to the rotating shaft of the motor 170, a moving direction of the lubricant G is a direction from the opening section 30 toward the body section 31 of the flexible gear 3 as indicated by an arrow F1 in FIG. 4.

In the gear device in the past, the lubricant retained in a meshing portion of the internal teeth and the external teeth gradually flows out according to such movement of the lubricant. When such outflow of the lubricant continues, finally, the lubricant is depleted to cause a lubrication failure and reduce the life of the gear device.

Therefore, in this embodiment, as shown in FIG. 4, a wall section 6 that reduces the outflow of the lubricant G from the meshing portion of the internal tooth 23 and the external tooth 33 are provided. The wall section 6 is provided at one end portion of tooth width of the rigid gear (the internal gear) and projects from the position of a tooth bottom 231 of the internal tooth 23 of the rigid gear 2 toward the axis "a" (the rotation axis) side. Since the wall section 6 projects, the wall section 6 can also be called "projecting section". Since the wall section 6 projects from the position of the tooth bottom 231 of the internal tooth 23, the wall section 6 functions as a dam for damming the lubricant G retained in the tooth bottom 231. Therefore, the gear device unit 10 including the wall section 6 can retain the lubricant G for a long period. Therefore, a lubrication failure less easily occurs and extension of the life of the gear device unit 10 is achieved.

"The wall section 6 projects from the position of the tooth bottom 231" indicates a state in which the wall section 6 projects from the tooth bottom 231 or, when the tooth bottom 231 is extended in a tooth trace direction, an extended line of the tooth bottom 231 to the axis "a" side. For example, in the case of FIG. 4, the wall section 6 projects upward from an extended line of the tooth bottom 231 extended to the left side.

Figure 5:
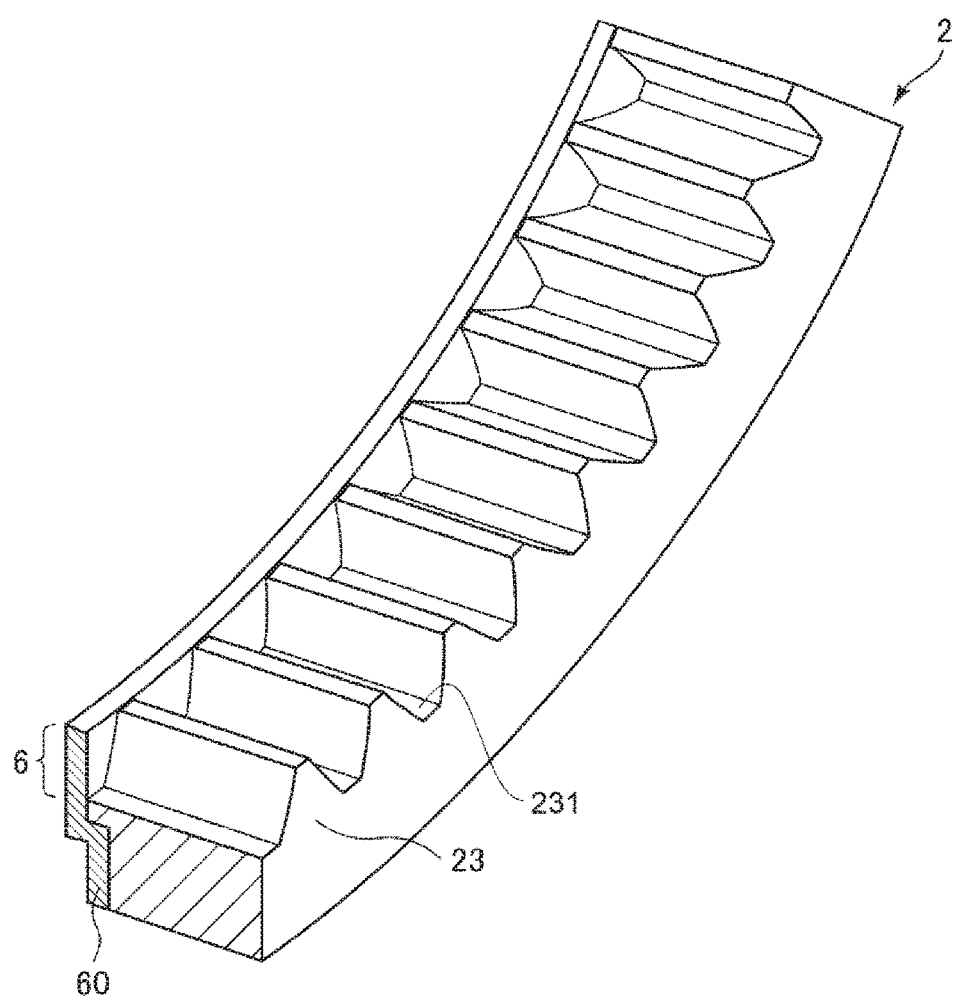
FIG. 5 is a partial sectional perspective view showing a rigid gear and a wall section shown in FIG. 4.
Figure 6:
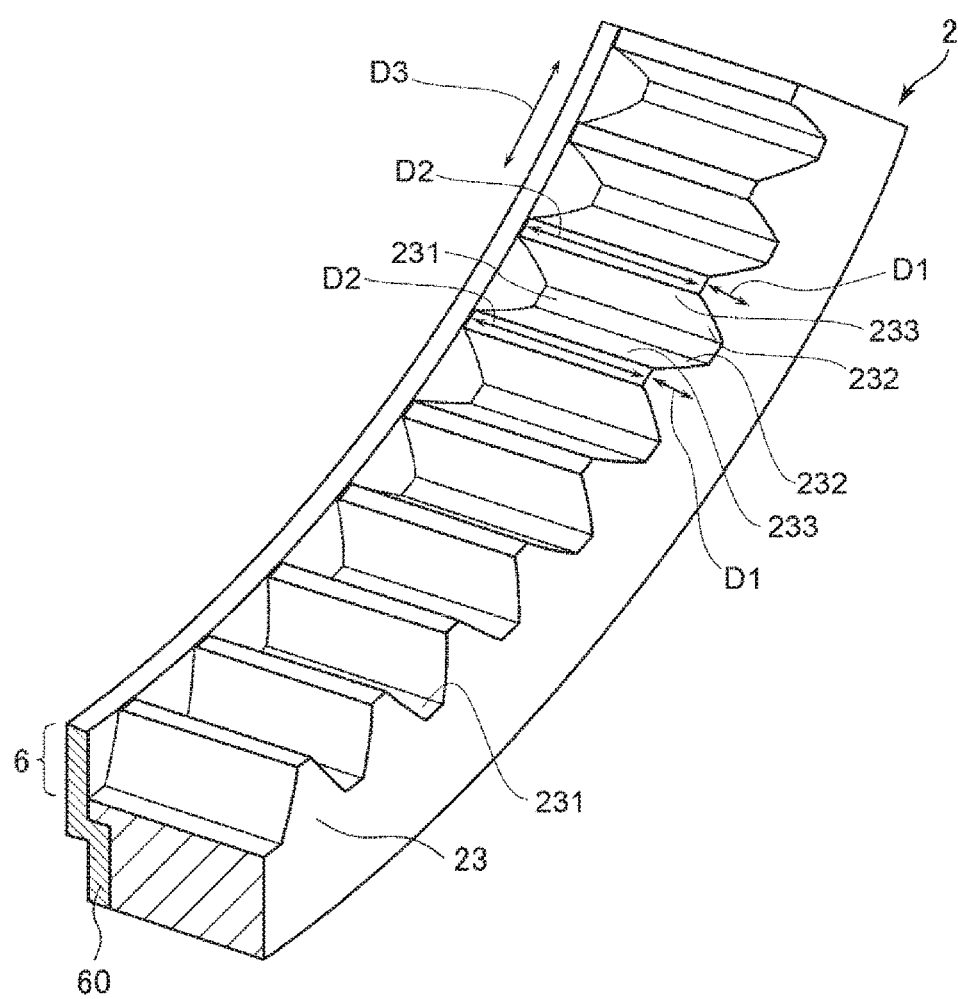
FIG. 6 is a view showing details of the rigid gear shown in FIG. 5.

FIG. 5 is a partial sectional perspective view showing the rigid gear 2 and the wall section 6 shown in FIG. 4. FIG. 6 is a view showing details of the rigid gear 2 shown in FIG. 5.

A plurality of wall sections 6 are provided at one end portion of the tooth width of the rigid gear 2, that is, on a downstream of movement of the lubricant G in a tooth trace direction D2 (see FIG. 6) of the internal teeth 23. In this embodiment, as explained above, the flexible gear 3 (the external gear) includes the external teeth 33 that center on the axis "a" (the rotation axis) and partially mesh with the rigid gear 2 (the internal gear), the tubular opening section 30 opened on one side, and the tubular body section 31 coupled to the other side of the opening section 30. The wave motion generator 4 is coupled to the motor 170 (the driving source). One end portion of the tooth width of the rigid gear 2 is present on the body section 31 side of the flexible gear 3. In this way, the wall sections 6 are provided at one end portion of the tooth width present on the body section 31 side of the flexible gear 3. Consequently, the lubricant G less easily flows out. A sufficient amount of the lubricant G is easily retained near the internal teeth 23.

In this embodiment, the wall sections 6 and the internal teeth 23 are in contact with each other. Specifically, the wall section 6 is in contact with two internal teeth 23 adjacent to each other in a circumferential direction D3 and the tooth bottom 231 present between the two internal teeth 23.

In general, the length of teeth in a radial direction from a rotation center of a gear is referred to as "tooth depth" and the radial direction is referred to as "tooth depth direction". In the tooth depth direction, a side close to a tooth bottom is referred to as dedendum and a side far from the tooth bottom is referred to as addendum. A direction parallel to a rotation axis of the gear is referred to as "tooth trace direction".

Therefore, in the case of FIG. 6, in a tooth depth direction D1 of the internal teeth 23 of the rigid gear 2, a side close to the tooth bottom 231 is a dedendum 232 and a side far from the tooth bottom 231 is an addendum 233. The wall section 6 shown in FIG. 6 only has to be in contact with at least the dedendum 232 of the two internal teeth 23 present on both sides of the tooth bottom 231 together with the tooth bottom 231. Consequently, the wall section 6 is located on one end side of the tooth width of the booth bottom 231. The internal teeth 23 are located on both sides in the circumferential direction D3 of the teeth bottom 231, that is, a direction orthogonal to both of the tooth depth direction D1 and the tooth trace direction D2 shown in FIG. 6. As a result, dams are provided in three directions of the tooth bottom 231. The lubricant G much less easily flows out.

In this embodiment, the wall section 6 configures a part of a lubricant retaining ring 60. The lubricant retaining ring 60 is formed in an annular shape along the circumferential direction of the internal gear. That is, the lubricant retaining ring 60 is disposed at one end portion of the tooth width of the rigid gear 2 shown in FIG. 4. In the lubricant retaining ring 60, a portion projecting from the position of the tooth bottom 231 of the internal teeth 23 toward the axis "a" side is equivalent to the wall section 6. Consequently, the wall section 6 is also formed in an annular shape along the circumferential direction of the internal gear. In this way, the wall sections 6 corresponding to the internal teeth 23 are coupled to one another and are formed in an annular shape. Consequently, there is an advantage that it is easy to treat the wall sections 6 and it is easy to perform adjustment work for projecting length of the wall sections 6.

The wall sections 6 do not need to be provided corresponding to all the internal teeth 23 (all the tooth bottoms 231). The wall sections 6 may not be provided in a part of the internal teeth 23. However, the wall sections 6 are desirably provided corresponding to all the internal teeth 23.

A constituent material of the wall sections 6 (in this embodiment, a constituent material of the lubricant retaining ring 60) is not particularly limited. Examples of the constituent material include, besides metal-based materials such as iron-based material such as cast iron, nickel-chrome-molybdenum steel, chrome-molybdenum steel (SCM), maraging steel, and stainless steel, aluminum-based materials such as aluminum and alloys of aluminum, titanium-based materials such as titanium and alloys of titanium, and copper-based materials such as copper and alloys of copper, ceramics materials such as alumina and magnesia, carbon-based materials such as graphite, thermosetting resin such as polyimide resin, phenolic resin, epoxy resin, polyester resin, and melamine resin, and thermoplastic resin such as polyamide resin (e.g., nylon), thermosetting urethane resin, polyolefin resin (e.g., polyethylene and polypropylene), polycarbonate, polyester resin (e.g., polyethylene terephthalate and polybutylene terephthalate), polyacetal, polyphenylene sulfide, polyether ether ketone, liquid crystal polymer, fluorocarbon resin (e.g., polytetrafluoroethylene and polyvinylidene fluoride), modified polyphenylene ether, polysulfone, polyether sulfone, polyarylate, polyamide-imide, polyether imide, and thermoplastic polyimide. The constituent material of the wall sections 6 may be a composite material containing two or more kinds of these materials.

The constituent material of the wall sections 6 is desirably the metal-based material. Consequently, the wall sections 6 achieve both of high mechanical strength and stability against the lubricant G. As a result, it is possible to realize the gear device unit 10 having high reliability.

Figure 7:
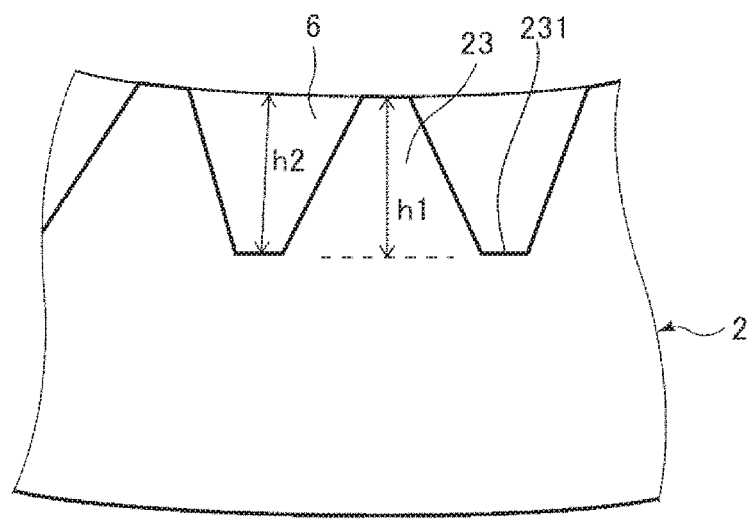
FIG. 7 is a view of the rigid gear and the wall section shown in FIG. 5 viewed from the other end portion side of tooth width of the rigid gear.

FIG. 7 is a view of the rigid gear 2 and the wall section 6 shown in FIG. 5 viewed from the other end portion side of the tooth width of the rigid gear 2.

In FIG. 7, tooth depth of the internal tooth 23 is represented as h1 and the distance from the tooth bottom 231 of the wall section 6 to the tip of the internal tooth 23 is represented as projection length h2 (length in the tooth depth direction from the tooth bottom 231). The projection length h2 of the wall section 6 may be larger than the tooth depth h1 of the internal teeth 23 but is desirably set to the tooth depth h1 or less. Consequently, it is possible to prevent the wall section 6 from interfering with the flexible gear 3 and avoid deterioration in transmission efficiency involved in the interference.

The projection length h2 of the wall section 6 is desirably set to 1% or more and 100% or less of the tooth depth h1 of the internal tooth 23 and more desirably set to 30% or more and 100% or less of the tooth depth h1 of the internal tooth 23. By setting the projection length h2 of the wall section 6 within the range, it is possible to achieve both of a reduction of outflow of the lubricant G by the wall section 6 and prevention of interference of the wall section 6 with the flexible gear 3.

As explained above, the gear device unit 10 includes the gear device 1 including the rigid gear 2, which is the internal gear, the flexible gear 3, which is the external gear having flexibility that partially meshes with the rigid gear 2 and rotates relatively (to the rigid gear 2) around the axis "a" (the rotation axis), and the wave motion generator 4 that comes into contact with the inner circumferential surface of the flexible gear 3 and moves the meshing position of the rigid gear 2 and the flexible gear 3 in the circumferential direction around the axis "a". The gear device unit 10 further includes the wall sections 6 provided at one end portion of the tooth width of the rigid gear 2 and projecting from the position of the tooth bottoms 231 of the rigid gear 2 toward the axis "a" side.

With such a gear device unit 10, it is possible to reduce outflow of the lubricant G from the meshing portion of the internal teeth 23 and the external teeth 33. Consequently, the lubricant G can be retained for a long period. Therefore, it is possible to prevent occurrence of a lubrication failure and achieve extension of the life and improvement of efficiency of the gear device unit 10.

The robot 100 according to this embodiment includes the base 110, which is the first member, the first arm 120, which is the second member that pivots with respect to the base 110, the gear device 1 that transmits, from the base 110 side to the first arm 120 side (from one side to the other side of the first member and the second member), a driving force for pivoting the first arm 120 with respect to the base 110, and the motor 170, which is the driving source that generates the driving force. Further, the gear device 1 includes the rigid gear 2, the flexible gear 3, and the wave motion generator 4. The robot 100 includes the rigid gear 2, which is the internal gear, the flexible gear 3, which is the external gear, the wave motion generator 4, and the wall sections 6.

With such a robot 100, it is possible to reduce outflow of the lubricant G from the meshing portion of the internal teeth 23 and the external teeth 33. Consequently, the lubricant G can be retained for a long period. Therefore, it is possible to prevent occurrence of a lubrication failure and achieve extension of the life, improvement of efficiency and increase in speed of the robot 100.

Second Embodiment

A second embodiment of the present disclosure is explained.

Figure 8:
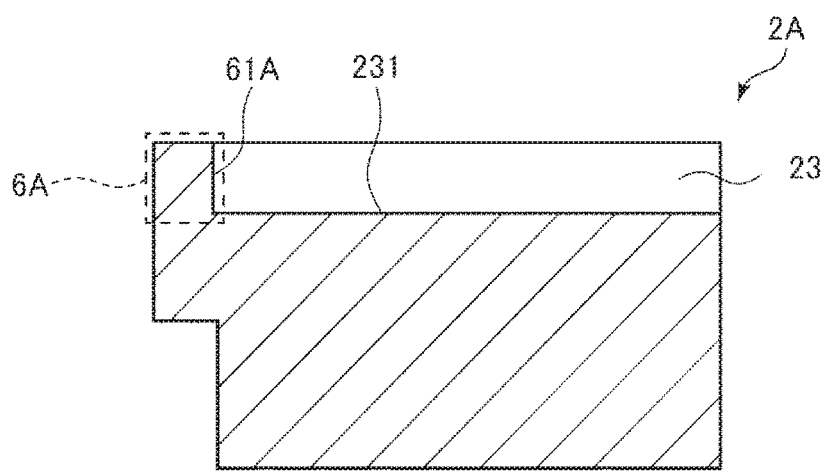
FIG. 8 is a sectional view showing a rigid gear and a wall section according to a second embodiment of the present disclosure.

FIG. 8 is a sectional view showing a rigid gear and a wall section according to the second embodiment of the present disclosure.

This embodiment is the same as the first embodiment except that the configurations of the rigid gear and the wall section are different. In the following explanation, concerning this embodiment, differences from the first embodiment are mainly explained. Explanation concerning similarities is omitted. In FIG. 8, the same components as the components in the first embodiment are denoted by the same reference numerals and signs.

A wall section 6A shown in FIG. 8 is integrated with the rigid gear 2 (the internal gear) explained above. That is, this embodiment is different from the first embodiment in that, whereas a part of the lubricant retaining ring 60, which is the member different from the rigid gear 2 shown in FIG. 5, is the wall section 6 in the first embodiment, the wall section 6A and the rigid gear 2 are integrated to configure a rigid gear 2A in this embodiment. That is, the gear device according to this embodiment includes the rigid gear 2A including the wall section 6A. In the rigid gear 2A, the wall section 6A is in contact with the two internal teeth 23 adjacent to each other in the circumferential direction and the tooth bottom 231 present between the two internal teeth 23.

With such a rigid gear 2A, it is possible to further increase joining strength of the rigid gear 2A and the wall section 6A. Therefore, it is possible to reduce a probability that the wall section 6A comes off the rigid gear 2A. It is possible to further improve reliability of the gear device including the rigid gear 2A. Since the rigid gear 2A can be treated integrally with the wall section 6A, it is possible to achieve simplification of assembly work of the gear device.

"The wall section 6A is integrated with the rigid gear 2A" indicates a state in which, in the rigid gear 2A, the wall section 6A and the other parts are formed of the same material and there is no boundary surface. Therefore, the wall section 6A and the other parts of the rigid gear 2A can be simultaneously manufactured by various manufacturing methods such as casting, injection molding, and cutting. Consequently, it is possible to achieve simplification of a manufacturing process and a reduction in cost.

Among surfaces of the wall section 6A, a side surface 61A facing a space (a tooth groove) between the internal teeth 23 perpendicularly crosses a tooth trace direction of the rigid gear 2A. Consequently, the wall section 6A does not affect the tooth groove between the internal teeth 23. Therefore, the wall section 6A less easily interferes with the external teeth 33 (see FIG. 4).

Figure 9:
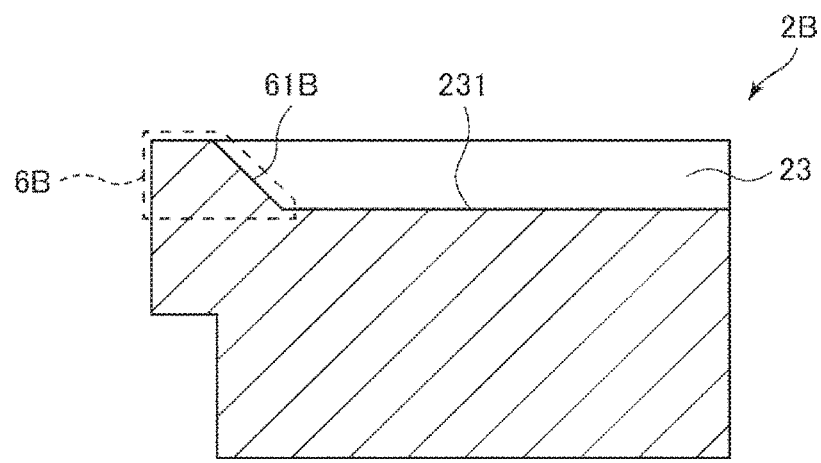
FIG. 9 is a sectional view showing a modification of the gear device and the wall section shown in FIG. 8.
Figure 10:
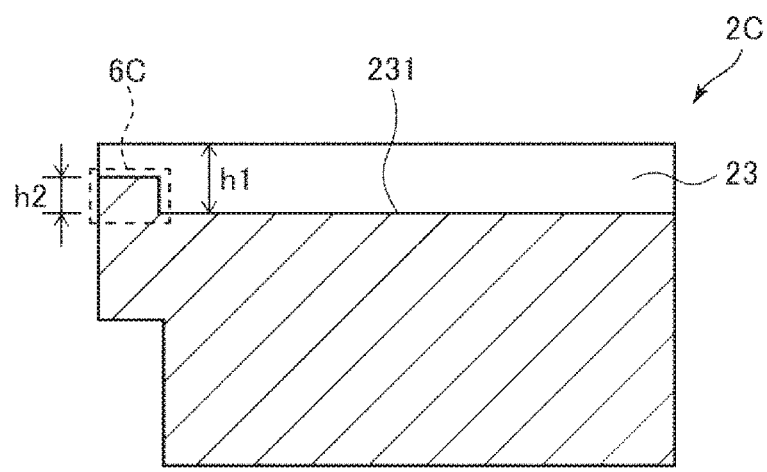
FIG. 10 is a sectional view showing a modification of the gear device and the wall section shown in FIG. 8.
Figure 11:
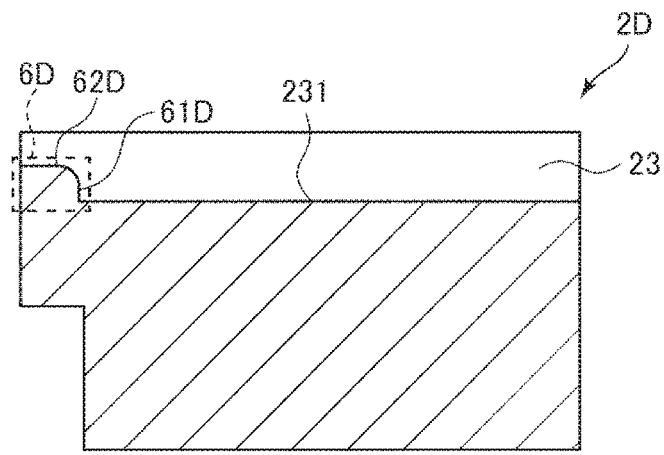
FIG. 11 is a sectional view showing a modification of the gear device and the wall section shown in FIG. 8.

FIGS. 9 to 11 are respectively sectional views showing modifications of the gear device and the wall section shown in FIG. 8.

In the following explanation, concerning the modifications, differences from the second embodiment are mainly explained. Explanation concerning similarities is omitted. In FIGS. 9 to 11, the same components as the components in the second embodiment are denoted by the same reference numerals and signs.

A wall section 6B shown in FIG. 9 is integrated with a rigid gear 2B (an internal gear) in the same manner as shown in FIG. 8. On the other hand, among surfaces of the wall sections 6B shown in FIG. 9, a side surface 61B facing a space between the internal teeth 23 crosses the surface of the tooth bottom 231 of the rigid gear 2B at an obtuse angle. That is, the perpendicular of the side surface 61B is inclined further to the axis "a" side (the center side) of the rigid gear 2B (the internal gear) than the tooth trace direction. Consequently, stress less easily concentrates on the vicinity of an intersection line of the side surface 61B and the tooth bottom 231. Therefore, it is easy to prevent occurrence of a crack and the like. It is possible to further improve the reliability of the gear device unit 10.

A crossing angle of the side surface 61B and the tooth bottom 231 is desirably more than 90° and 160° or less and more desirably 100° or more and 150° or less.

A wall section 6C shown in FIG. 10 is integrated with a rigid gear 2C (an internal gear) in the same manner as shown in FIG. 8. A wall section 6D shown in FIG. 11 is integrated with a rigid gear 2D (an internal gear) in the same manner as shown in FIG. 8.

On the other hand, the projection length h2 of the wall section 6C shown in FIG. 10 is shorter than the tooth depth h1 of the rigid gear 2C. Consequently, as explained above, it is possible to achieve both of a reduction of outflow of the lubricant G by the wall section 6C and prevention of interference of the wall section 6C with the flexible gear 3.

In a wall section 6D shown in FIG. 11, among surfaces of the wall section 6D, a cross section of a ridge line connecting a top surface 62D facing the axis "a" (see FIG. 2) and a side surface 61D facing a space between the internal teeth 23 is rounded. That is, rounding work is applied to the ridge line of the top surface 62D and the side surface 61D. With such a shape, it is possible to further reduce a probability that the wall section 6D interferes with the flexible gear 3.

According to the second embodiment and the modifications of the second embodiment, the same effects as the effects in the first embodiment are obtained.

Third Embodiment

A third embodiment of the present disclosure is explained.

Figure 12:
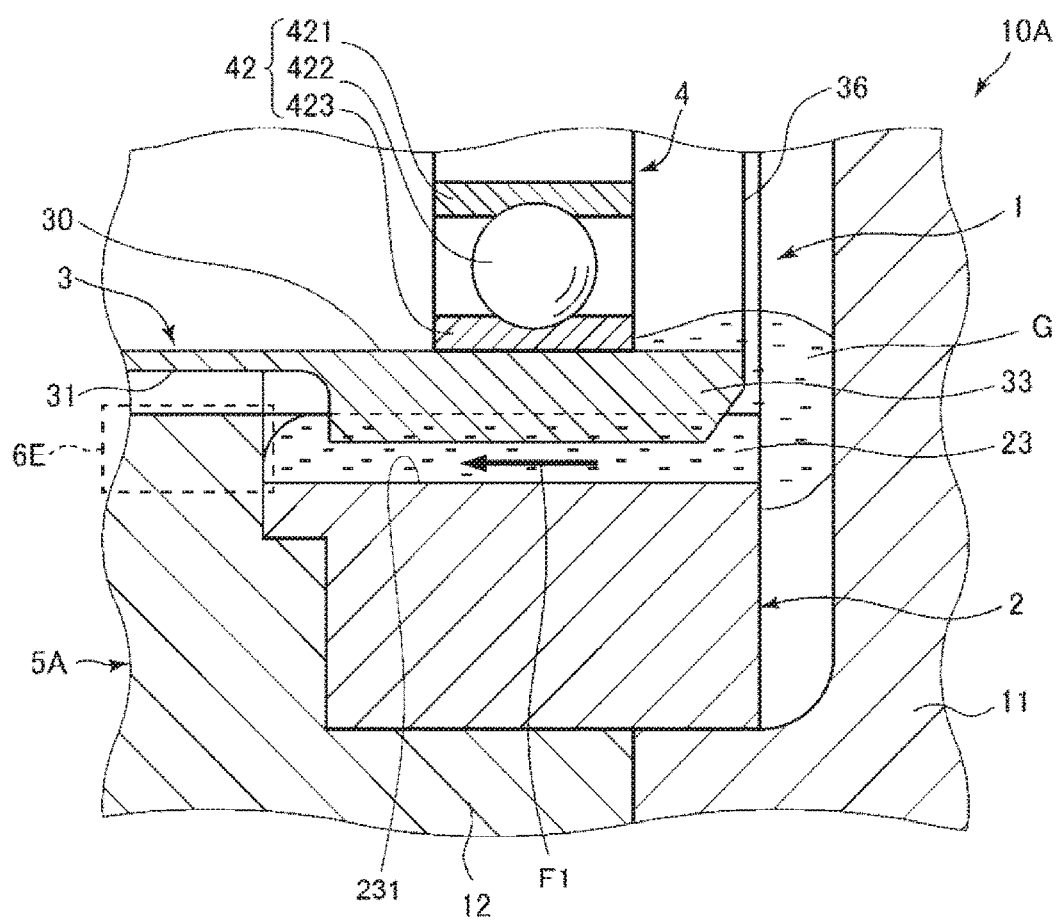
FIG. 12 is a partially enlarged sectional view showing a gear device unit according to a third embodiment of the present disclosure.

FIG. 12 is a partially enlarged sectional view showing a gear device unit according to the third embodiment of the present disclosure.

This embodiment is the same as the embodiments explained above except that the configuration of a wall section is different. In the following explanation, differences from the embodiments explained above are mainly explained. Explanation concerning similarities is omitted. In FIG. 12, the same components as the components in the embodiments explained above are denoted by the same reference numerals and signs.

In a gear device unit 10A shown in FIG. 12, a part of a case 5A is a wall section 6E. That is, the gear device unit 10A shown in FIG. 12 includes a case 5A that houses the gear device 1. The wall section 6E is integrated with the case 5A.

With such a configuration, since the wall section 6E can be treated integrally with the case 5A, it is possible to achieve simplification of assembly work of the gear device unit 10A.

"The case 5A is integrated with the wall section 6E" indicates a state in which the case 5A and the wall section 6E are formed of the same material and there is no boundary surface. Therefore, the case 5A and the wall section 6E can be simultaneously manufactured by various manufacturing methods such as casting, injection molding, and cutting. Consequently, it is possible to achieve simplification of a manufacturing process and a reduction in cost.

A constituent material of the case 5A is not particularly limited. The constituent material is selected, as appropriate, from the examples of the constituent materials of the wall section 6 in the first embodiment.

The case 5A may be a case that houses only the gear device 1 or may be a case that is a housing of the base 110.

According to the third embodiment explained above, the same effects as the first and second embodiments can be obtained.

Fourth Embodiment

A fourth embodiment of the present disclosure is explained.

Figure 13:
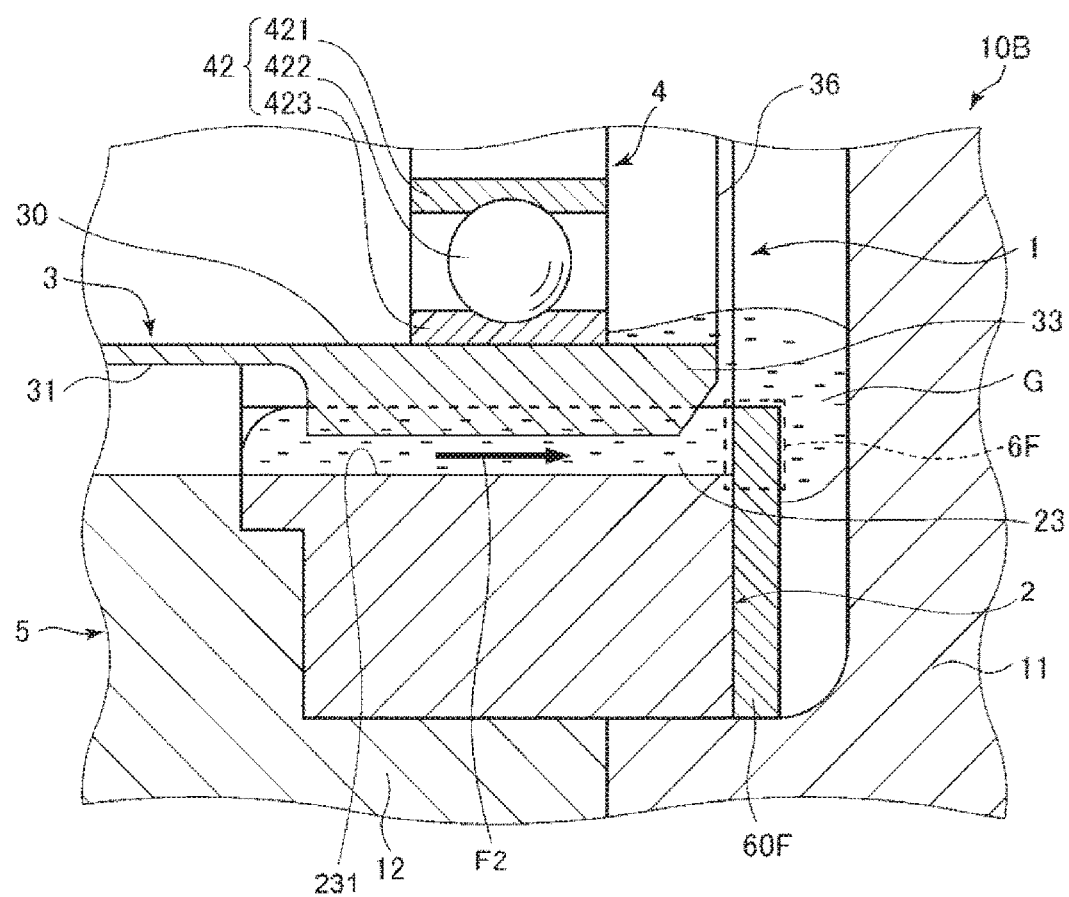
FIG. 13 is a partially enlarged sectional view showing a gear device unit according to a fourth embodiment of the present disclosure.

FIG. 13 is a partially enlarged sectional view showing a gear device unit according to the fourth embodiment.

This embodiment is the same as the embodiments explained above except that coupling destinations of an input shaft side and an output shaft side are changed and the configuration of a wall section is different. In the following explanation, concerning this embodiment, differences from the embodiments explained above are mainly explained. Explanation concerning similarities is omitted. In FIG. 13, the same components as the components in the embodiments explained above are denoted by the same reference numerals and signs.

In a gear device unit 10B shown in FIG. 13, although not shown in FIG. 13, the rotating shaft of the motor 170 is coupled to the flexible gear 3. The wave motion generator 4 is fixed (coupled) to the base 110. The rigid gear 2 is coupled to the first arm 120. That is, the gear device unit 10B shown in FIG. 13 functions as a reduction gear in which the flexible gear 3 is the input shaft side and the rigid gear 2 is the output shaft side.

When the input shaft side and the output shaft side are changed in this way, the moving direction of the lubricant G is different from the arrow F1 shown in FIG. 4. That is, in the gear device unit 10B shown in FIG. 13, an arrow F2 indicating the moving direction of the lubricant G is opposite to the arrow F1. Therefore, in the meshing portion of the internal teeth 23 and the external teeth 33, the moving direction of the lubricant G is a direction from the body section 31 toward the opening section 30 of the flexible gear 3.

In the gear device unit 10B shown in FIG. 13, a wall section 6F is provided at one end portion of the tooth width of the rigid gear 2, that is, on a downstream of the movement of the lubricant G in the tooth trace direction of the internal tooth 23. That is, this embodiment is different from the first embodiment in that, whereas "one end portion of the tooth width of the rigid gear 2" in the first embodiment is an end portion on the body section 31 side of the flexible gear 3 (the left side in FIG. 4) with respect to the rigid gear 2, "one end portion of the tooth width of the rigid gear 2" in this embodiment is an end portion on the opposite side of the body section 31 side of the flexible gear 3 (the right side in FIG. 13).

Such a wall section 6F also functions as a dam for damming the lubricant G retained in the tooth bottom 231. Therefore, according to this embodiment as well, the lubricant G can be retained for a long period. Therefore, it is possible to realize the gear device unit 10B in which a lubrication failure less easily occurs and extension in life is achieved.

The wall section 6F according to this embodiment configures a part of a lubricant retaining ring 60F. By providing the lubricant retaining ring 60F as a member different from the rigid gear 2 in this way, it is easy to move the lubricant retaining ring 60F as appropriate. That is, there is an advantage that it is easy to perform adjustment work for projection length of the wall section 6F.

As explained above, in this embodiment, the flexible gear 3 (the external gear) includes the tubular opening section 30 including the external teeth 33, which center on the axis "a" (the rotation axis) and mesh with the rigid gear 2 (the internal gear), and opened on one side and the tubular body section 31 coupled to the other side of the opening section 30. The flexible gear 3 is coupled to the motor 170 (the driving source). One end portion of the tooth width of the rigid gear 2 is the end portion on the opposite side of the body section 31 side of the flexible gear 3 (the right side in FIG. 13).

With such a gear device unit 10B, it is possible to reduce outflow of the lubricant G from the meshing portion of the internal teeth 23 and the external teeth 33. Consequently, the lubricant G can be retained for a long period. Therefore, it is possible to prevent occurrence of a lubrication failure and achieve extension of the life and improvement of efficiency of the gear device unit 10B.

According to the fourth embodiment explained above, the same effects as the effects in the first to third embodiments are obtained.

Fifth Embodiment

A fifth embodiment of the present disclosure is explained.

Figure 14:
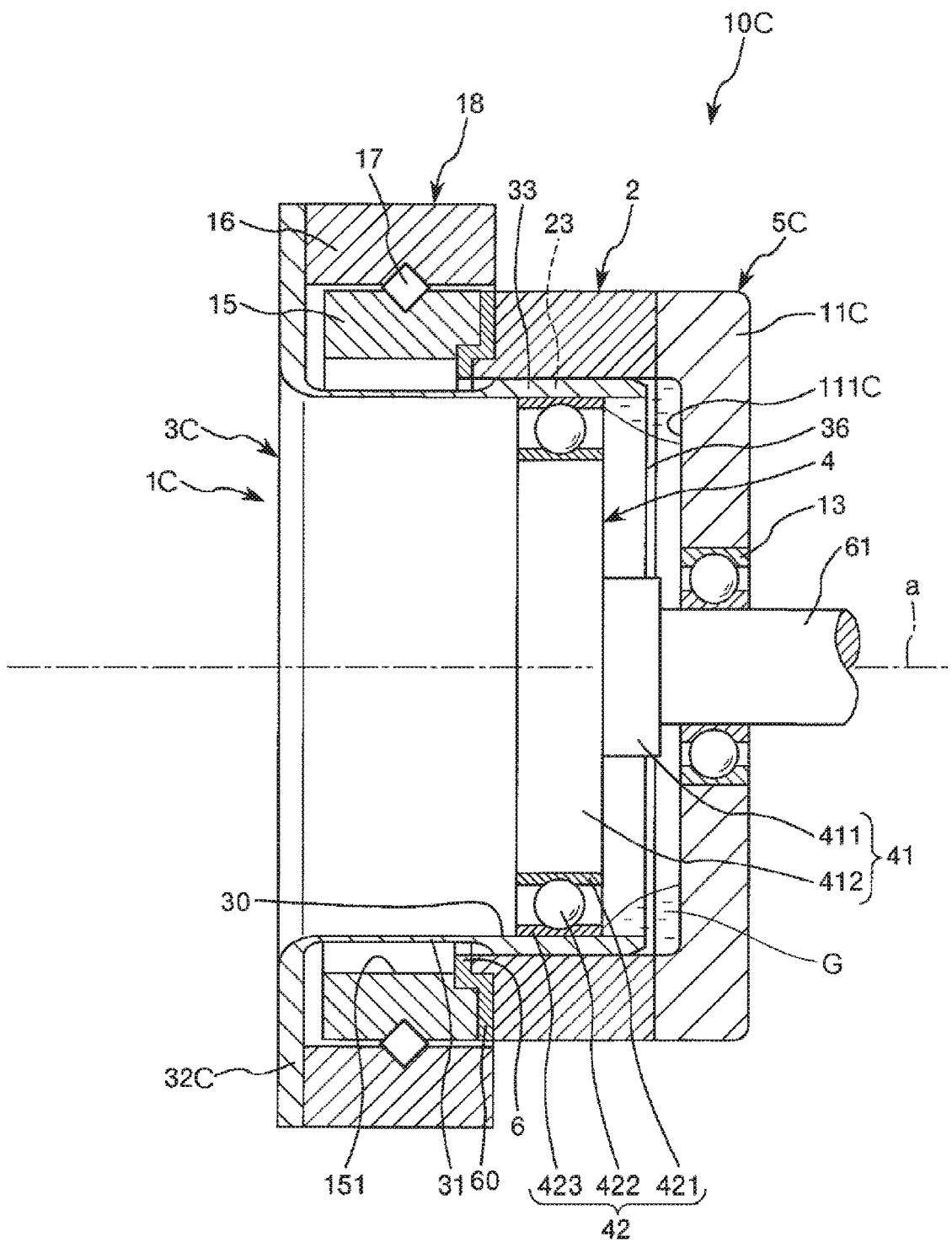
FIG. 14 is a sectional view showing a gear device unit according to a fifth embodiment of the present disclosure.

FIG. 14 is a sectional view showing a gear device unit according to the fifth embodiment of the present disclosure.

This embodiment is the same as the first embodiment in that the configuration of a flexible gear and the configuration of a case involved in the configuration of the flexible gear are different. In the following explanation, concerning this embodiment, differences from the embodiments explained above are mainly explained. Explanation concerning similarities is omitted. In FIG. 14, the same components as the components explained above are denoted by the same reference numerals and signs.

A gear device unit 10C shown in FIG. 14 includes a gear device 1C and a case 5C that houses the gear device 1C. The case 5C may be omitted.

The gear device unit 10C includes a flexible gear 3C, which is an external gear of a hat type disposed on the inner side of the rigid gear 2. The flexible gear 3C includes a flange section 32C (a coupling section) coupled to one end portion of the tubular body section 31 and projecting to the opposite side of the axis "a" (a direction away from the axis "a"). A not-shown output shaft is attached to the flange section 32C.

The case 5C includes a substantially tabular lid body 11C that supports the shaft 61 (e.g., the input shaft) via the bearing 13 and a cross roller bearing 18 attached to the flange section 32C of the flexible gear 3C.

The lid body 11C is fixed to one side surface (on the right side in FIG. 14) of the rigid gear 2 by screwing or the like. The cross roller bearing 18 includes an inner ring 15, an outer ring 16, and a plurality of rollers 17 disposed between the inner ring 15 and the outer ring 16. The inner ring 15 is provided along the outer circumference of the body section 31 of the flexible gear 3C and fixed to the other side surface (on the left side in FIG. 14) of the rigid gear 2 by screwing or the like. On the other hand, the outer ring 16 is fixed to the surface on the body section 31 side of the flange section 32C of the flexible gear 3C by screwing or the like.

An inner wall surface 111C of the lid body 11C is formed in a shape expanding in a direction perpendicular to the axis "a" to cover the opening 36 of the flexible gear 3C. An inner wall surface 151 of the inner ring 15 of the cross roller bearing 18 is formed in a shape conforming to the outer circumferential surface of the body section 31 of the flexible gear 3C.

The gear device unit 10C explained above includes the lubricant retaining ring 60 including the wall section 6 as in the first embodiment. Therefore, it is possible to reduce outflow of the lubricant G from the meshing portion of the internal teeth 23 and the external teeth 33. Consequently, the lubricant G can be retained for a long period. Therefore, it is possible to prevent occurrence of a lubrication failure and achieve extension of the life and improvement of efficiency of the gear device unit 10C.

The embodiments of the present disclosure are explained above with reference to the drawings. However, the present disclosure is not limited to the embodiments. The components of the sections can be replaced with any components having the same functions. Any other components may be added to the present disclosure.

In the embodiments, the gear device unit is explained in which the base included in the robot is the "first member" and the first arm is the "second member" and the driving force is transmitted from the first member to the second member. However, the present disclosure is also applicable to a gear device unit in which an n-th arm is the "first member" and a (n+1)-th arm is the "second member", n being an integer equal to or larger than 1, and the driving force is transmitted from one of the n-th arm and the (n+1)-th arm to the other. The present disclosure is also applicable to a gear device unit in which the driving force is transmitted from the second member to the first member.

In the embodiments, a horizontal articulated robot is explained. However, the present disclosure is not limited to this. For example, the number of joints of the robot is optional. The present disclosure is also applicable to a vertical articulated robot.

In the embodiments, the example is explained in which the gear device unit is incorporated in the robot. However, the gear device unit according to the present disclosure can be used by being incorporated in various devices having a configuration for transmitting the driving force from one side to the other side of the first member and the second member that pivot with respect to each other.

What is claimed is:

1. A robot comprising:
   a first member;
   a second member configured to pivot with respect to the first member;
   a gear device configured to transmit, from one side to another side of the first member and the second member, a driving force for pivoting the second member with respect to the first member; and
   a driving source configured to generate the driving force, wherein
   the gear device includes:
      an internal gear including internal teeth; and
      an external gear including external teeth, which partially mesh with the internal gear, and having flexibility, the external gear relatively rotating around a rotation axis with respect to the internal gear; and
      a wave motion generator configured to come into contact with an inner circumferential surface of the external gear and move a meshing position of the internal gear and the external gear in a circumferential direction around the rotation axis,
   the gear device further includes a wall section disposed at an end portion of tooth width of the internal gear and coupled to two dedenda adjacent to each other in the circumferential direction of the internal gear and a tooth bottom present between the two, and
   wherein length in a tooth depth direction from the tooth bottom of the wall section is equal to or smaller than tooth depth of the internal gear.

2. The robot according to claim 1, wherein the wall section is formed in an annular shape along a circumferential direction of the internal gear.

3. The robot according to claim 1, wherein the wall section is integrated with the internal gear.

4. The robot according to claim 1, further comprising a case configured to house the gear device, wherein
   the wall section is integrated with the case.

5. The robot according to claim 1, wherein
   the external gear includes:
      a tubular opening section including external teeth, which center on the rotation axis and mesh with the internal gear, and opened on one side; and
      a tubular body section coupled to another side of the opening section,
   the wave motion generator is coupled to the driving source, and
   the wall section is disposed at an end portion on the body section side of the internal gear.

6. The robot according to claim 1, wherein
   the external gear includes:

a tubular opening section including external teeth, which center on the rotation axis and mesh with the internal gear, and opened on one side; and a tubular body section coupled to another side of the opening section, the external gear is coupled to the driving source, and the end portion where the wall section is disposed is an opposite side of the body section side.

7. A gear device comprising:

an internal gear including internal teeth;

an external gear including external teeth, which partially mesh with the internal gear, and having flexibility, the external gear relatively rotating around a rotation axis with respect to the internal gear; and a wave motion generator configured to come into contact with an inner circumferential surface of the external gear and move a meshing position of the internal gear and the external gear in a circumferential direction around the rotation axis, wherein the internal gear includes a wall section coupled to two dedenda adjacent to each other in the circumferential direction and a tooth bottom present between the two dedenda and disposed at an end portion of tooth width, and wherein length in a tooth depth direction from the tooth bottom of the wall section is equal to or smaller than tooth depth of the internal gear.

8. A gear device unit comprising:

a gear device including:

an internal gear including internal teeth;

an external gear including external teeth, which partially mesh with the internal gear, and having flexibility, the external gear relatively rotating around a rotation axis with respect to the internal gear; and a wave motion generator configured to come into contact with an inner circumferential surface of the external gear and move a meshing position of the internal gear and the external gear in a circumferential direction around the rotation axis; and a wall section disposed at an end portion of tooth width of the internal gear and coupled to two dedenda adjacent to each other in the circumferential direction of the internal gear and a tooth bottom present between the two dedenda, and wherein the length in a tooth depth direction from the tooth bottom of the wall section is equal to or smaller than tooth depth of the internal gear.

* * * * *